United States Patent [19]

Gandy

[11] Patent Number: 5,115,485
[45] Date of Patent: May 19, 1992

[54] CABLE FOR HOUSING PARALLELLY ORIENTED OPTICAL FIBERS AND METHOD AND APPARATUS FOR PRODUCING THE SAME

[75] Inventor: Ronald L. Gandy, Culpeper, Va.

[73] Assignee: Rochester Corporation, Culpeper, Va.

[21] Appl. No.: 166,316

[22] Filed: Mar. 10, 1988

Related U.S. Application Data

[63] Continuation-in-part of Ser. No. 45,599, May 4, 1987, abandoned, and a continuation-in-part of Ser. No. 45,863, May 4, 1987, abandoned.

[51] Int. Cl.$^5$ ............................................... G02B 6/44
[52] U.S. Cl. ..................................... 385/101; 385/103
[58] Field of Search ..................... 350/96.23; 264/174

[56] References Cited

U.S. PATENT DOCUMENTS

| | | | |
|---|---|---|---|
| 2,581,922 | 1/1952 | Spencer | 18/8 |
| 3,264,404 | 8/1966 | Trebby | 174/130 |
| 3,328,874 | 7/1967 | Davis et al. | 29/470.5 |
| 3,608,035 | 9/1971 | Frohlich | 264/146 |
| 3,707,836 | 1/1973 | Lovett | 57/1 UN |
| 3,717,720 | 2/1973 | Snellman | 174/131 A |
| 3,887,265 | 6/1975 | Margolis | 350/96 B |
| 3,972,970 | 8/1976 | Taylor | 264/45.9 |
| 4,037,923 | 7/1977 | Beal | 350/96 B |
| 4,050,867 | 9/1977 | Ferrentino et al. | 425/114 |
| 4,129,468 | 12/1978 | Knab | 156/148 |
| 4,132,756 | 1/1979 | Ferrentino | 264/174 |
| 4,156,104 | 5/1979 | Mondello | 174/70 |
| 4,172,106 | 10/1979 | Lewis | 264/1 |
| 4,212,612 | 7/1980 | Piper | 425/114 |
| 4,221,756 | 9/1980 | Piper et al. | 264/174 |
| 4,409,154 | 10/1983 | Grenat | 264/1.5 |
| 4,541,970 | 9/1985 | Caverly, Jr. et al. | 264/1.5 |
| 4,550,976 | 11/1985 | Cooper et al. | 350/96.23 |
| 4,553,815 | 11/1985 | Martin | 350/96.23 |
| 4,568,507 | 2/1986 | Baxter | 264/172 |
| 4,623,218 | 11/1986 | Laurette et al. | 350/96.23 |
| 4,640,576 | 2/1987 | Eastwood et al. | 350/96.23 |
| 4,645,298 | 2/1987 | Gartside, III | 350/96.23 |
| 4,659,424 | 4/1987 | Baxter | 156/51 |
| 4,701,016 | 10/1987 | Gartside, III et al. | 350/96.23 |
| 4,708,833 | 11/1987 | Ohsawa et al. | 264/1.5 |
| 4,744,935 | 5/1988 | Priaroggia et al. | 264/103 |
| 4,767,183 | 8/1988 | Martin | 350/96.23 |
| 4,787,705 | 11/1989 | Shinmoto et al. | 350/96.23 |
| 4,801,764 | 1/1989 | Ohlhaber | 350/96.23 X |
| 4,815,814 | 3/1989 | Ulijasz | 350/96.23 |

FOREIGN PATENT DOCUMENTS

| | | |
|---|---|---|
| 212303 | 11/1957 | Australia . |
| 57-90601 | 6/1982 | Japan . |
| 58-100103 | 6/1983 | Japan . |
| 61-176904 | 8/1986 | Japan . |

*Primary Examiner*—John D. Lee
*Assistant Examiner*—John Ngo
*Attorney, Agent, or Firm*—Lorusso & Loud

[57] ABSTRACT

Disclosed is a cable which utilizes optical fibers where the optical fibers run substantially parallel to the cable. Also disclosed is a system for fabricating a cable which utilizes parallelly oriented optical fibers. The system includes an extrusion device which positions the optical fibers substantially parallel within the cable and covers the fibers with an elastomeric material in a single step.

5 Claims, 4 Drawing Sheets

CABLE FOR HOUSING PARALLELLY ORIENTED OPTICAL FIBERS AND METHOD AND APPARATUS FOR PRODUCING THE SAME

CROSS REFERENCE TO RELATED APPLICATION

This application is a continuation-in-part of U.S. Ser. No. 045,599 filed on May 4, 1987, and U.S. Ser. No. 045,863 filed on May 4, 1987, both have been abandoned.

BACKGROUND OF THE INVENTION

The present invention relates to cables containing optical fibers and more specifically to such cables where the optical fibers run substantially parallel to the cable and to a support or strengthening member within the cable. The present invention also relates to an apparatus and method for fabricating cables containing optical fibers where the optical fibers run substantially parallel to the cable and the support member of the cable.

Optical fibers, sometimes called fiber optics, are signal transmitting media that transmit light signals faster and with less distortion than electrically conductive wires transmit electrical signals. Because of these characteristics optical fibers are a desireable transmission medium. Optical fibers are constructed with two sections: a central core and a cladding which surrounds the core. The central core is made of a material that transmits light and the cladding is made of a material that has a lower refractive index than the central core. The difference in the refractive index of the two materials causes a condition of total internal reflection within the optical fiber. Total internal reflection causes a major portion of a transmitted signal to be reflected and transmitted within the central core. A major problem with optical fibers is that they are very fragile and therefore are damaged very easily.

The prior art discloses cables in which the optical fibers are wrapped in a helical shape around a central support member and imbedded in a protective covering. A function of this structure is to protect the fragile fibers. See FIG. 1 labeled PRIOR ART. For example, U.S. Pat. No. 4,156,104 to Mondello discloses a submarine cable for optical communications which utilizes helically oriented optical fibers. There are a number of problems associated with cables utilizing helically oriented optical fibers.

By forming cables in which optical fibers are wrapped in a helix, the optical fiber may be damaged or attenuated. Damage or attenuation of an optical fiber may result in distortion and/or attenuation of any signals sent through the fiber. Distortion of a signal is problematic since it necessitates adding filters to the receiving apparatus to obtain the true signal. It is also problematic since, in some cases, a signal may be distorted to such an extent that no amount of manipulation of the received signal can recover the true signal. Attenuation of a signal is problematic in that more booster stations are needed to transmit an attenuated signal. Since booster stations are very expensive, attenuation of a signal increases the cost of building a system which relies on optical fibers to carry a signal.

Another problem with cables using helically oriented optical fibers is that the helical orientation necessitates the use of a longer length of optical fiber than the length of cable into which it is placed. This is problematic since optical fibers are expensive. Therefore, it is desirable to reduce the amount of optical fibers required for a given length of cable.

Another problem with the prior art involves the method in which cables which utilize optical fibers are fabricated. Prior to the present invention such cables were fabricated in a multi-step process: i.e. the optical fibers were wrapped around a central core then the protective coating was applied over the cable. A multi-step process increases the cost of fabricating cables which utilize optical fibers.

SUMMARY OF THE INVENTION

The present invention is a signal carrying cable containing one or more optical fibers where the optical fibers run parallel with the cable. Such a cable is fabricated by a system utilizing a unique extrusion device. The extrusion device positions the optical fibers substantially parallel to a strength member and injection molds molten elastomeric material around the strength member and optical fibers to produce the cable in one step. Thus, a cable is produced wherein the optical fibers and the strength member are positioned parallel to each other and imbedded in an elastomeric material.

Accordingly, it is an object of the present invention to provide a cable where the optical fibers run parallel with the cable.

Another object of the present invention is to provide a method which reduces the attenuation and distortion associated with cables utilizing optical fibers.

Another object of the present invention is to provide a method to reduce the amount of optical fiber required to fabricate a cable utilizing optical fibers.

Another object of the present invention is to provide a method of fabricating a cable containing optical fibers in a one step operation.

These and other objects and features of the present invention will be more fully understood from the following detailed description which should be read in light of the accompanying drawings in which corresponding reference numerals refer to corresponding parts throughout the several views. Also, in the drawings, several identical parts will be identified with reference numerals followed by a letter. In such a case, where the part is referenced to solely by the numeral, any one of the identical parts may be referred to for purposes of the description.

DESCRIPTION OF THE PREFERRED EMBODIMENTS

Figure 1:
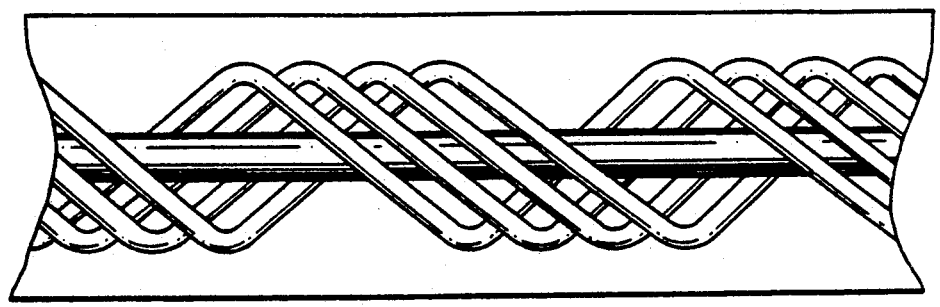
FIG. 1 labeled PRIOR ART is a perspective view of a known cable utilizing optical fibers with its protective covering broken away.
Figure 2:
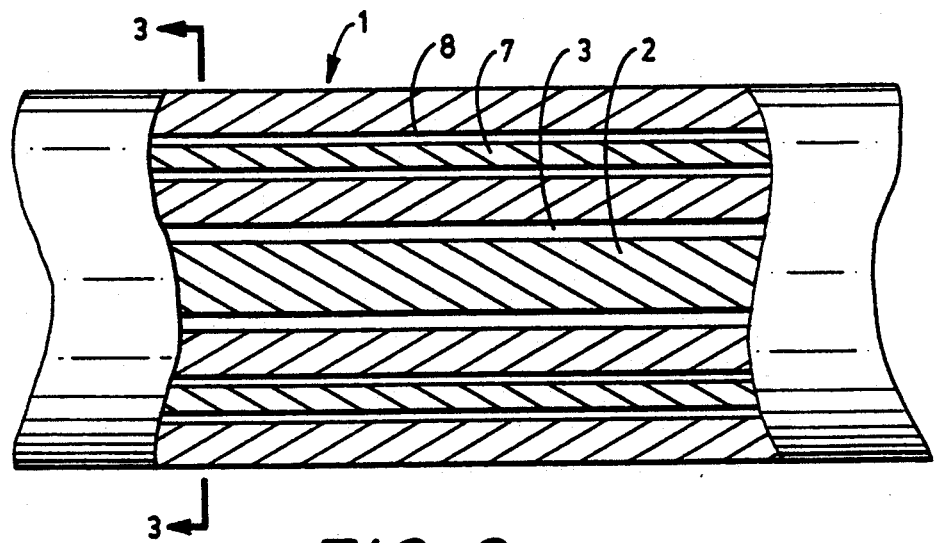
FIG. 2 is an exploded view, partially in section and partially with the protective covering removed, of a cable containing a number of parallelly oriented optical fibers in accordance with the present invention.
Figure 3:
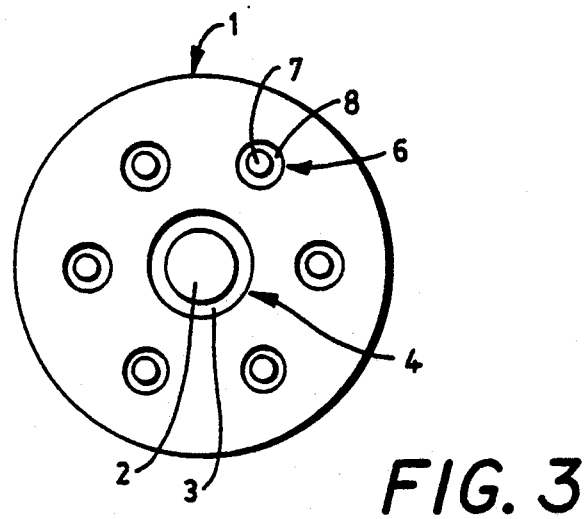
FIG. 3 is a cross-sectional view of a cable in accordance with the present invention taken along line 3—3 of FIG. 2.

At the outset, the present invention is described in its broadest overall aspects with a more detailed description following. The present invention is a cable which utilizes optical fibers where the optical fibers are oriented parallel to the cable. The present invention is also a system for fabricating a cable which utilizes optical fibers where the optical fibers are oriented parallel with the cable. The system includes an extrusion device which positions the optical fibers parallel to a strength member prior to extrusion such that when the cable is extruded the optical fibers remain parallel to the strength member.

In one important embodiment, the present invention is a cable consisting of six optical fibers positioned substantially parallel to the cable as well as to a central support core.

The central support core or strength member of this important embodiment is an electrically conductive, coated wire 4 formed of 1/1000 inch diameter steel 2. The wire 2 is coated with a polyester elastomer 3. A suitable polyester is sold under the trademark HYTREL available from Dupont. In a preferred embodiment the coating may be Dupont HYTREL 4056 or Dupont HYTREL 5556. The number following the trademark HYTREL designates the hardness of the material, i.e. the Dupont HYTREL 4056 is a softer material than the Dupont HYTREL 5556.

The optical fibers 6 used in this important embodiment are fibers with a glass core 7 covered by a plastic acrylate cladding 8. The glass core 7 of the optical fiber 6 will have a higher refractive index than the plastic used for the cladding 8 thereby creating a condition of total internal reflection for light being transmitted along the fiber. The optical fibers 6 may have different relative indices of refraction and may be constructed of different materials depending on the particular application but they all exhibit the condition of total internal reflection. The fibers may be purchased commercially from AT & T, Corning, Spectran, or Sumatomo. The diameters of the optical fiber 6 will vary from 250 microns to 500 microns depending on the particular application.

The central support core 4 and the optical fibers 6 are imbedded in a polyester elastomer 10. A suitable polyester is sold under the trademark HYTREL available from Dupont. The combination of the support core 4, the optical fibers 6, and the polyester elastomer 10 is the cable 1.

In an alternate embodiment the optical fiber 6 may be located in the center of the cable and the support member 4 may surround this optical fiber.

Figure 4:
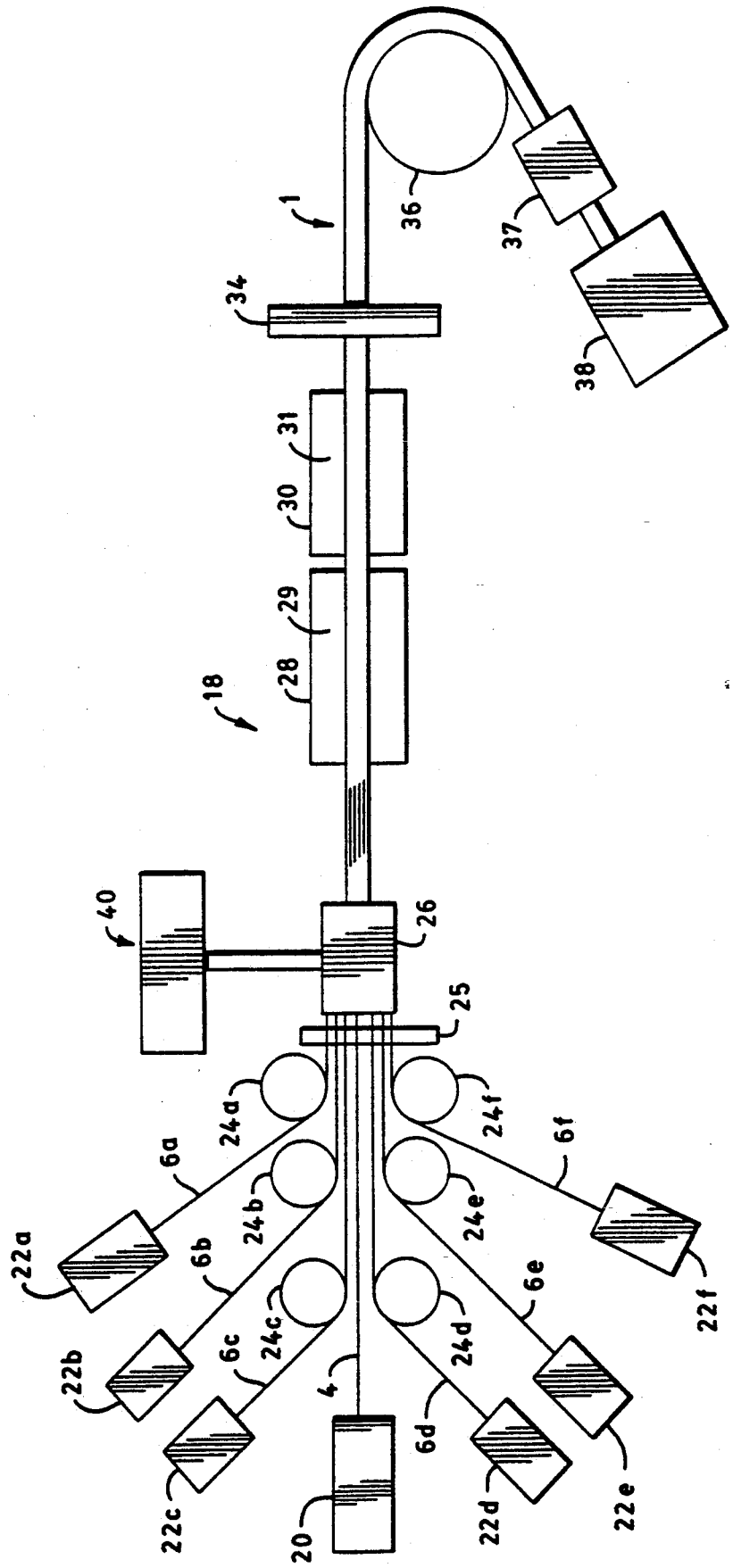
FIG. 4 is a schematic view of a system for fabricating a cable containing parallelly oriented optical fibers in accordance with the present invention.

FIG. 4 is a schematic view of a preferred embodiment of a parallel optical fiber fabricating system 18. The system 18 consists of a series of feeder reels 20, 22a–22f, a series of positioning pullies 24a–24f, an extrusion device 26, a cooling system 28–31, a diameter monitor 34, a tension control device 36, dancer reels 37 and a take-up reel 38. The present invention is described with reference to a system for constructing a cable containing six optical fibers; however, it is to be understood that the system may fabricate cables with any number of optical fibers.

Fabrication of the cable 1 begins by paying out a coated wire 4 from a payout drum 20 through a central conduit of a spacing device 25 to an extrusion device 26. Optical fibers 6a–6f are then paid out in a conventional manner from a series of optical fiber feeder reels 22a–22f. The optical fibers are approximately positioned by a series of positioning pullies 24a–24f and then more accurately positioned by feeding the fibers 6a–6f through apertures on the skirt of the spacing device 25 which is positioned perpendicular to the coated wire. The spacing device 25 is a flat metal disk with a central aperture and with apertures positioned at different points around the central aperture. From the spacing device 25 the optical fibers are fed into the extrusion device 26.

Molten plastic 12 is stored in a storage bin 40 from which it is fed into the extrusion device 26. The extrusion device 26 combines the coated wire 4, the optical fibers 6a–6f and the molten plastic 42 to form the optical cable 1 where the optical fibers 6a–6f run parallel to the support wire 4 within the cable 1.

When the extruded cable 1 leaves the extrusion device 26 it is fed into a hot water trough 28 where there is countercurrent flow between the cable 1 and the hot water 29. The hot water 29 is heated to a temperature of about 125° F. so that when the cable, which is at a temperature of about 400° F., leaves the extrusion device 26 it does not experience any thermal shock. The cable 1 then passes through a second water trough 30, which has a countercurrent flow between the cable 1 and the water 31. The water 31 in the second water trough 30 is ordinary tap water 31 with a temperature of about 70° F. After the cable 1 leaves the second water trough 30 it is dried further by air flow.

The cable 1 is monitored by a laser diameter monitor 34. The diameter monitor 34 is in communication with the feed-out reels so that the cable 1 is fed at an appropriate speed through the system. From the laser diameter monitor 34, the cable is then fed to a tension control device 36 which in the present embodiment is a capstan. The tension control device 36 is in communication with the feeder reels 20, 22a–22f and with the extrusion device 26 to accurately control the tension of the cable 1. The cable is then fed through dancer reels 37 which also assists in tension control of the cable and finally to a take-up reel 38 where the cable 1 is stored.

Figure 5:
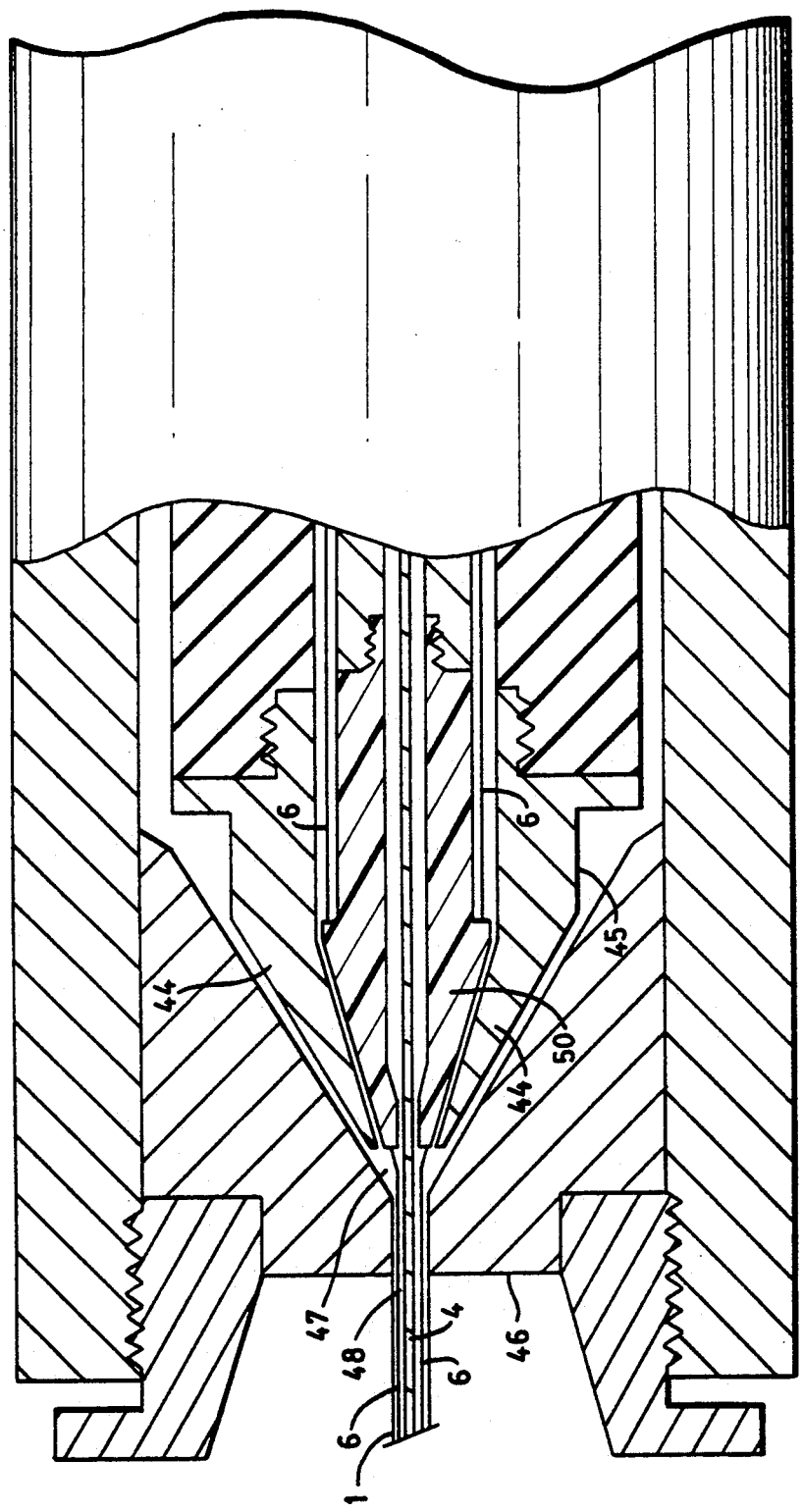
FIG. 5 is an exploded view of an extrusion device of the system of FIG. 4 for fabricating a cable in accordance with the present invention.
Figure 6:
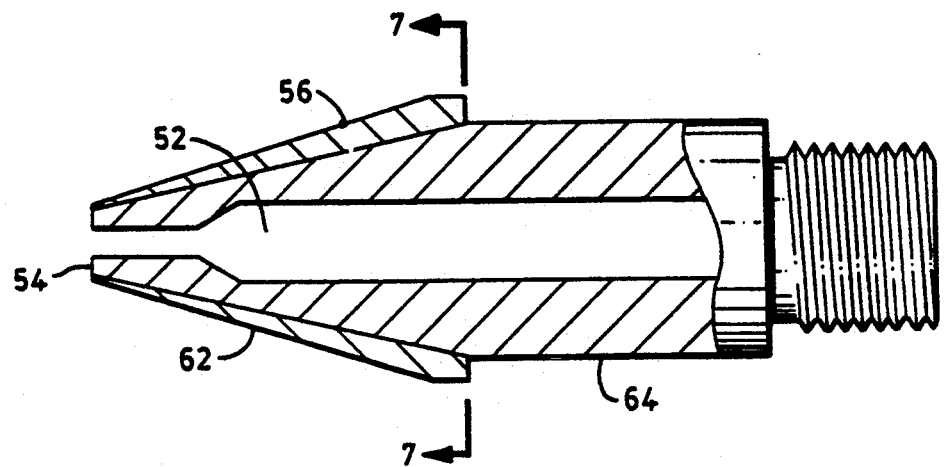
FIG. 6 is a sectional view of a device for parallelly directing optical fibers into the extrusion die in accordance with the present invention.
Figure 7:
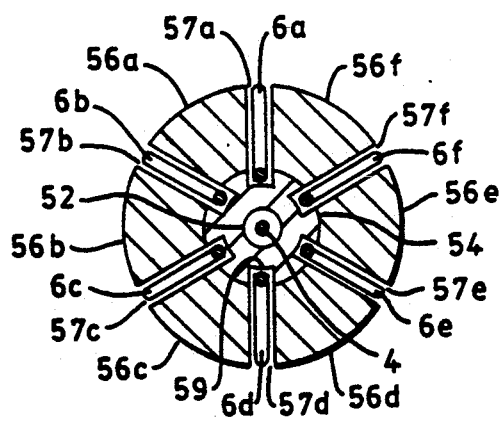
FIG. 7 is a sectional view taken along line 7—7 of FIG. 6.

The extrusion device of the present invention will now be described in more detail. A preferred embodiment of the extrusion device 26 can be seen in detail in FIG. 5. A principal part of the extrusion device is a directional device 50 which is shown in detail in FIGS. 6 and 7.

The directional device 50 is a device that is shaped much like a harpoon. The device 50 has a conical section 62 and a cylindrical section 64. One end of the cylindrical section 64 is positioned central to and contiguous to the base of the conical section 62. The directional device 50 is constructed with a central conduit 52 which passes through the cylindrical section 64 and the conical section 62 to the vertex 54 of the conical section 62. In one important embodiment the coated wire 4 travels through this central conduit 52 to the vertex 54 of the conical section 62.

The surface of the conical section 62 of the directional device 50 has a series of groove members 56 which define a series of axial grooves 57. The axial grooves 57 carry, align and direct the optical fibers 6a–6f from the base of the conical section 62 to channels 59a-59f on the vertex 54 of the conical section 62 of the extrusion die 50. This channeling of the optical fibers 6a-6f produces a situation where the optical fibers 6a-6f converge to a very narrow diameter ring where all the fibers are essentially parallel with the central coated wire 4, each other optical fiber 6a-6f and the fiber optic cable 1.

The directional device 50 is positioned within a cone shaped central core member 44. The interior surface of the central core member 44, which is positioned contiguous to the groove members 56 of the directional device 50, acts in conjunction with the extrusion die 50 to position the optical fibers 6a-6f. The central core member 44 is positioned within a cone shaped channel die 46 such that there is a channel 49 defined by the central core member 44 and the channel die 46 through which the molten plastic 42 can flow. The central core member 44 includes a defector 45 which channels the molten plastic 42 down through the molten plastic channel 49 to the vertex 54 of the directional device 50. The coated wire 4, the optical fibers 6a-6f, and the molten plastic 42 combine at a junction 47 defined by the directional device's vertex 54, the central core member 44 and the channel die 46. The combination of the coated wire 4, the optical fibers 6a-6f, and the molten plastic 42 is then extruded through a circular aperture 48 defined by the channel die 46 to form the cable 1.

It is to be understood that the forms of the cable for housing parallelly oriented optical fibers and method and apparatus for producing the same described herein are preferred embodiments and that the device may be constructed of various other materials and with some change in shape and size without departing from the spirit or scope of the invention. For example, while the system of the present invention has been described with reference to a six optical fiber cable, the system may of course be constructed to accommodate any number of optical fibers. These and all other variations and modifications are intended to fall within the scope of the claims which follow.

What is claimed is:

1. An apparatus for fabricating a cable having an electrically conductive strength member surrounded by and imbedded in an elastomeric material, said strength member being substantially parallel to an axis of said cable, and a plurality of signal transmitting optical fibers completely surrounded by and imbedded in said elastomeric material, said optical fibers being substantially parallel to said strength member along the entire length of said cable, comprising:

means for storing and paying out a plurality of optical fibers and a strengthening member;
   means for positioning said plurality of optical fibers substantially parallel to said strengthening member;
   extrusion means for extruding a cable, said extrusion means receiving said positioned optical fibers, said strength member and molten elastomeric material and producing a hot extruded cable where said optical fibers are substantially parallel to said strength member along the entire length of said cable and said strength member is substantially parallel to an axis of said cable and said optical fibers and said strength member are imbedded in said elastomeric material;
   means for reducing the temperature of said hot extruded cable; and,
   means for storing said cable.

2. The apparatus for fabricating a cable of claim 1 wherein said extrusion means comprises:

directional means, said directional means directing and aligning said optical fibers to a narrow diameter ring around said strengthening member;
   die means, said die means injecting said elastomeric material around said optical fibers and said strengthening member.

3. The apparatus for fabricating a cable of claim 1 wherein said directional means comprises:

a conical first portion and a cylindrical second portion;
   said conical first portion having a conduit passing through the center of the base of the cone to the vertex of the cone;
   said cylindrical second portion having a conduit passing through the center of the cylinder from a first end of the cylinder to a second end of the cylinder;
   said cylindrical second portion having a smaller outside diameter than the diameter of the base of said conical first portion;
   said first end of said cylindrical second portion central to and contiguous to the base of said conical first portion;
   said conical first portion having one or more groove means which define one or more axial grooves said axial grooves running on the outside of the cone from the base of the cone to the vertex of the cone.

4. A method for fabricating a cable having an electrically conductive strength member surrounded by and imbedded in an elastomeric material, said strength member being substantially parallel to an axis of said cable, and a plurality of signal transmitting optical fibers completely surrounded by and imbedded in said elastomeric material, said optical fibers being substantially parallel to said strength member along the entire length of said cable, comprising:

paying out a strengthening member;
   paying out a plurality of optical fibers;
   positioning said plurality of optical fibers substantially in a circular shape around said strengthening member and substantially parallel to said optical strengthening member;
   feeding said positioned plurality of optical fibers, said strengthening member and molten elastomeric material into an extrusion means;
   extruding a hot cable from said extrusion means where said cable comprises said strengthening member with said plurality of optical fibers substantially parallel to said strengthening member and said strengthening member and said optical fibers are imbedded in said molten elastomeric material;
   cooling and solidifying said hot cable; and,
   storing said cooled and solidified cable.

5. A signal transmitting cable comprising:

an electrically conductive strength member surrounded by and embedded in an elastomeric material, said strength member being substantially parallel to an axis of said cable;
   a plurality of signal transmitting optical fibers completely surrounded by and embedded in said elastomeric material, said optical fibers being substantially parallel to said strength member along the entire length of said cable wherein one of said optical fibers is positioned in the center of said cable and said strength member surrounds said optical fiber.

* * * * *